United States Patent
Martinez Franco et al.

(10) Patent No.: US 11,472,711 B2
(45) Date of Patent: Oct. 18, 2022

(54) PROCESS FOR PREPARING AN IZM-2 ZEOLITE IN THE PRESENCE OF A MIXTURE OF NITROGENOUS ORGANIC STRUCTURING AGENTS IN HYDROXIDE FORM AND OF BROMIDE AND OF AN ALKALI METAL CHLORIDE

(71) Applicant: IFP Energies Nouvelles, Rueil-Malmaison (FR)

(72) Inventors: Raquel Martinez Franco, Rueil-Malmaison (FR); Monique Prigent, Rueil-Malmaison (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 110 days.

(21) Appl. No.: 17/032,044

(22) Filed: Sep. 25, 2020

(65) Prior Publication Data
US 2021/0094837 A1     Apr. 1, 2021

(30) Foreign Application Priority Data
Sep. 26, 2019   (FR) ........................................ 1910620

(51) Int. Cl.
*B01J 6/00*      (2006.01)
*B01J 19/00*     (2006.01)
*C01B 39/48*     (2006.01)

(52) U.S. Cl.
CPC ............... *C01B 39/48* (2013.01); *B01J 6/001* (2013.01); *B01J 19/0013* (2013.01); *B01J 2219/00051* (2013.01); *B01J 2219/00166* (2013.01); *C01P 2002/72* (2013.01)

(58) Field of Classification Search
CPC .......... B01J 19/0013; B01J 2219/00051; B01J 2219/00166; B01J 6/001; C01P 2002/72; C01B 37/02; C01B 39/48; C01B 39/06
See application file for complete search history.

(56) References Cited

U.S. PATENT DOCUMENTS

| | | | |
|---|---|---|---|
| 8,361,435 B2* | 1/2013 | Fecant | B01J 20/18 423/706 |
| 8,629,073 B2* | 1/2014 | Guillon | C07C 6/126 585/326 |
| 10,865,116 B2* | 12/2020 | Martinez Franco | C01B 39/04 |
| 10,875,778 B2* | 12/2020 | Martinez Franco | B01J 29/70 |
| 10,941,045 B1* | 3/2021 | Martinez Franco | C01B 37/02 |
| 2018/0273391 A1 | 9/2018 | Martinez Franco et al. | |
| 2018/0273393 A1 | 9/2018 | Martinez Franco et al. | |

FOREIGN PATENT DOCUMENTS

| | | | | |
|---|---|---|---|---|
| FR | 3064261 A1 | 9/2018 | | |
| FR | 3064262 A1 | 9/2018 | | |
| JP | 5 542 669 B2 * | 7/2014 | | B01J 20/10 |

OTHER PUBLICATIONS

Search Report dated Apr. 21, 2020 issued in corresponding FR 1910620 application (2 pages).

* cited by examiner

*Primary Examiner* — Timothy C Vanoy
(74) *Attorney, Agent, or Firm* — Millen, White, Zelano and Branigan, P.C.; Harry B. Shubin

(57) ABSTRACT

The invention relates to a process for preparing a synthetic IZM-2 zeolite, which consists in performing a hydrothermal treatment of an aqueous gel containing a source of silicon and a source of amorphous aluminium, two nitrogenous or structuring organic compounds including two quaternary ammonium functions, 1,6-bis(methylpiperidinium)hexane dihydroxide and 1,6-bis(methylpiperidinium)hexane dibromide, used as a mixture, in combination with a source of a specific alkali metal chloride M (preferably NaCl), the aqueous gel not comprising any source of at least one fluoride anion.

14 Claims, 2 Drawing Sheets

[Fig 1]
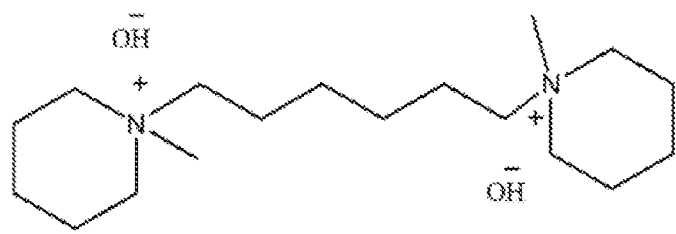
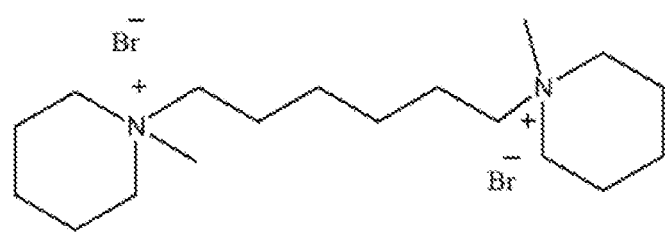
[Fig 2]
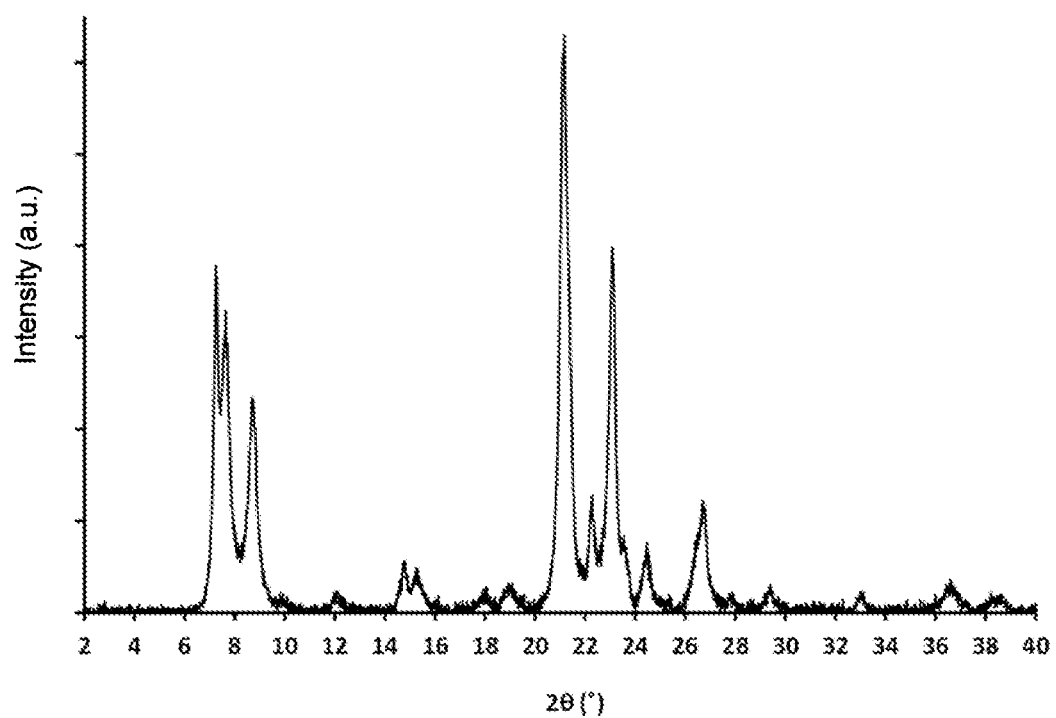

[Fig 3]
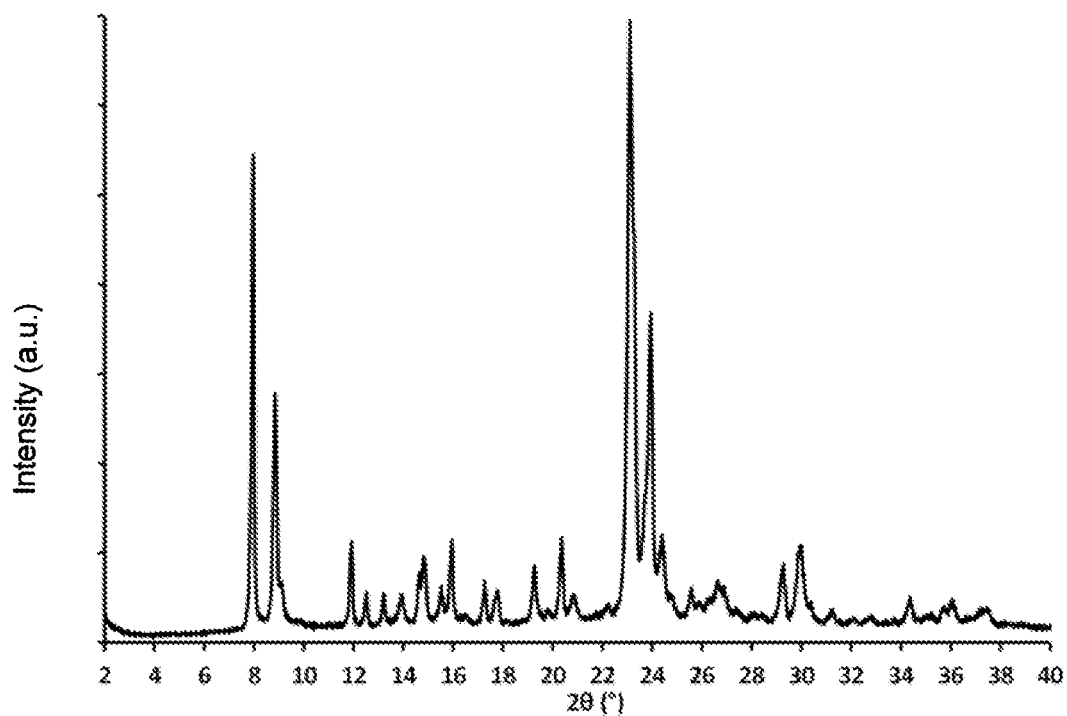

PROCESS FOR PREPARING AN IZM-2 ZEOLITE IN THE PRESENCE OF A MIXTURE OF NITROGENOUS ORGANIC STRUCTURING AGENTS IN HYDROXIDE FORM AND OF BROMIDE AND OF AN ALKALI METAL CHLORIDE

TECHNICAL FIELD

The present invention relates to a novel process for preparing a microporous crystalline solid, known as IZM-2 microporous solid or IZM-2 zeolite. This novel process makes it possible to perform the synthesis of an IZM-2 zeolite in the presence of two specific organic or structuring species including two quaternary ammonium functions. In particular, said novel process makes it possible to perform the synthesis of an IZM-2 zeolite, starting with at least one source of silicon, at least one source of aluminium, at least one source of at least one alkali metal M of valency n chosen from alkali metal chlorides and at least two specific organic or structuring molecules including two quaternary ammonium functions, 1,6-bis(methylpiperidinium)hexane dihydroxide and 1,6-bis(methylpiperidinium)hexane dibromide used as a mixture, in the absence of a fluorinated medium. Said IZM-2 microporous solid obtained according to the process of the invention advantageously finds its application as a catalyst, adsorbent or separating agent.

PRIOR ART

Crystalline microporous materials, such as zeolites or silicoaluminophosphates, are solids that are extensively used in the petroleum industry as catalysts, catalytic supports, adsorbents or separating agents. Although many microporous crystalline structures have been discovered, the refining and petrochemical industry is constantly in search of novel zeolitic structures which have particular properties for applications such as the purification or separation of gases, the conversion of carbon-based species or the like.

IZM-2 zeolite is a solid having an unknown structure. Model reactions were employed (meta-xylene isomerization and dismutation and n-decane isomerization-hydrocracking) for the purpose of predicting the topology of the IZM-2 microporous material (Fecant et al. in J.Catal., 20, (2013) 20-29). The results obtained for these reactions suggest that the structure of the IZM-2 material consists of two types of pore sizes (10-MR and 12-MR).

IZM-2 zeolite was synthesized in its aluminosilicate form (Fecant et al. FR2918050 A1) and in its purely silicic form (Fecant et al. FR2918050 A1 and Li et al. in Microporous Mesoporous Mater., 237 (2017) 222-227), using the quaternary ammonium ion 1,6-bis(methylpiperidinium)hexane as structuring agent, in its hydroxide or bromide form. In these documents, the synthesis consists in performing a hydrothermal treatment of an aqueous gel containing a source of silicon, a structuring agent (1,6-bis(methylpiperidinium) hexane) and optionally a source of amorphous aluminium, and optionally a source of an alkali metal and/or alkaline-earth metal (NaOH).

Recently, IZM-2 zeolite has been prepared using a zeolite of FAU framework type as source of silicon and of aluminium (Martinez Franco et al. FR 3064262 A1, FR 3064261 A1).

In patent application FR 3064262 A1, the synthesis consists in performing a hydrothermal treatment of an aqueous gel containing a zeolite of FAU framework type as source of silicon and of aluminium, optionally an additional source of $SiO_2$, a specific structuring agent, (1,6-bis(methylpiperidinium)hexane) bromide, a source of an alkali metal and/or alkaline-earth metal (preferably NaOH) and optionally a source of at least one fluoride anion, BF.

In patent application FR 3064261 A1, the synthesis consists in performing a hydrothermal treatment of an aqueous gel containing a zeolite of FAU framework type as source of silicon and of aluminium, optionally an additional source of $SiO_2$, a specific structuring agent, (1,6-bis(methylpiperidinium)hexane) dihydroxide, and a source of at least one fluoride anion, BF, and optionally in the presence of a source of an alkali metal, preferably NaOH.

The subject of the present invention is a novel process for preparing a synthetic IZM-2 zeolite, which consists in performing a hydrothermal treatment of an aqueous gel containing a source of silicon and a source of amorphous aluminium, two nitrogenous or structuring organic compounds including two quaternary ammonium functions, 1,6-bis(methylpiperidinium)hexane dihydroxide and 1,6-bis(methylpiperidinium)hexane dibromide, used as a mixture, in combination with a source of a specific alkali metal chloride M (preferably NaCl), the aqueous gel not comprising any source of at least one fluoride anion.

Thus, the Applicant has discovered that the two nitrogenous or structuring organic compounds including two quaternary ammonium functions, 1,6-bis(methylpiperidinium) hexane dihydroxide and 1,6-bis(methylpiperidinium)hexane dibromide, used as a mixture in the presence of at least one source of silicon, of at least one source of aluminium and optionally of other sources of at least one trivalent element and/or of at least one tetravalent element, and of at least one source of at least one alkali metal M of valency n, chosen from alkali metal chlorides, n being an integer greater than or equal to 1, in the absence of a fluorinated medium, leads to the production of a precursor gel of an IZM-2 zeolite of very high purity. Any other crystalline or amorphous phase is generally and very preferentially absent from the crystalline solid consisting of the IZM-2 zeolite obtained on conclusion of the preparation process.

SUMMARY OF THE INVENTION

In particular, the invention relates to a process for preparing an IZM-2 zeolite, comprising at least the following steps:

i) mixing, in aqueous medium, of at least one source of at least one tetravalent element X in oxide form $XO_2$, at least one source of at least one trivalent element in oxide form $Y_2O_3$, nitrogenous organic compounds $R(OH)_2$ and $R(Br)_2$, $R(OH)_2$ being 1,6-bis(methylpiperidinium)hexane dihydroxide, and $R(Br)_2$ being 1,6-bis(methylpiperidinium) hexane dibromide, and at least one source of at least one alkali metal M of valency n chosen from alkali metal chlorides, n being an integer greater than or equal to 1, M being chosen from lithium, potassium, sodium, caesium and a mixture of at least two of these metals, and in the absence of at least one source of at least one fluoride anion termed BF, BF being chosen from hydrofluoric acid in aqueous solution and fluorine salts in which B is a cation chosen from the cations $NH_4^+$, $Na^+$, $K^+$ and $Li^+$ and a mixture of at least two of these salts, the reaction mixture having the following molar composition:

$XO_2/Y_2O_3$ between 70 and 350 and preferably between 80 and 300

$H_2O/XO_2$ between 1 and 100 and preferably between 5 and 50

$R(OH)_2/XO_2$ between 0.006 and 0.25 and preferably between 0.01 and 0.15

$R(Br)_2/XO_2$ between 0.006 and 0.25 and preferably between 0.01 and 0.15

$M_{1/n}Cl/XO_2$ between 0.005 and 0.5 and preferably between 0.01 and 0.4, more preferably between 0.02 and 0.3, with X being chosen from silicon, germanium and titanium, and a mixture of at least two of these tetravalent elements, and X preferably being silicon, Y being chosen from aluminium, boron, iron, indium and gallium, and a mixture of at least two of these trivalent elements, Y preferably being aluminium, until a homogeneous precursor gel is obtained;

ii) hydrothermal treatment of said precursor gel obtained on conclusion of step i) at a temperature of between 120° C. and 220° C., for a time of between 1 day and 8 days.

The present invention thus lies in the preparation of a precursor gel of an IZM-2 zeolite, by means of the combination of two specific organic or structuring species, including two quaternary ammonium functions, 1,6-bis(methylpiperidinium)hexane dihydroxide and 1,6-bis(methylpiperidinium)hexane dibromide, used as a mixture, with a source of a specific alkali metal M, alkali metal chloride (preferably sodium chloride), the process being performed under specific operating conditions. More precisely, the combination of the specific reagents used, associated with the combination of the specific operating conditions used notably as regards the molar amount, expressed in the form of $M_{1/n}Cl$, of the source of alkali metal present in the form of chloride and the duration of step ii) of hydrothermal treatment of the gel.

One advantage of the present invention is that it provides a novel preparation process for forming a pure IZM-2 zeolite. Any other crystalline or amorphous phase is generally and very preferentially absent from the crystalline solid consisting of the IZM-2 zeolite obtained on conclusion of the preparation process.

Another advantage of the present invention is that it allows the preparation of an IZM-2 zeolite with an $SiO_2/Al_2O_3$ ratio of between 70 and 350 and preferably between 80 and 300.

DETAILED DESCRIPTION OF THE INVENTION

In accordance with the invention, the mixing step i) is performed in aqueous medium, by mixing at least one source of at least one tetravalent element X in oxide form $XO_2$, at least one source of at least one trivalent element in oxide form $Y_2O_3$, nitrogenous organic compounds $R(OH)_2$ and $R(Br)_2$, $R(OH)_2$ being 1,6-bis(methylpiperidinium)hexane dihydroxide, and $R(Br)_2$ being 1,6-bis(methylpiperidinium) hexane dibromide, and at least one source of at least one alkali metal M of valency n chosen from alkali metal chlorides, n being an integer greater than or equal to 1, M being chosen from lithium, potassium, sodium, caesium and a mixture of at least two of these metals, and in the absence of at least one source of at least one fluoride anion termed BF, BF being chosen from fluorine salts in which B is a cation chosen from the cations $NH_4^+$, $Na^+$, $K^+$ and $Li^+$, and a mixture of at least two of these salts, and hydrofluoric acid in aqueous solution, the reaction mixture having the following molar composition:

$XO_2/Y_2O_3$ between 70 and 350 and preferably between 80 and 300

$H_2O/XO_2$ between 1 and 100 and preferably between 5 and 50

$R(OH)_2/XO_2$ between 0.006 and 0.25 and preferably between 0.01 and 0.15

$R(Br)_2/XO_2$ between 0.006 and 0.25 and preferably between 0.01 and 0.15

$M_{1/n}Cl/XO_2$ between 0.005 and 0.5 and preferably between 0.01 and 0.4, more preferably between 0.02 and 0.3, with X being chosen from silicon, germanium, titanium and a mixture of at least two of these tetravalent elements, and X preferably being silicon, Y being chosen from aluminium, boron, iron, indium and gallium, and a mixture of at least two of these trivalent elements, Y preferably being aluminium, until a homogeneous precursor gel is obtained;

The mixture of step i) may also further comprise one or more tetravalent elements X other than silicon, chosen from the group formed by the following elements: germanium, titanium and/or the mixture may also comprise one or more trivalent elements Y, other than aluminium, chosen from the group formed by the following elements: iron, boron, indium and gallium.

Preferably, the mixing step i) is performed in aqueous medium, by mixing compounds consisting of:

at least one source of at least one tetravalent element X in oxide form $XO_2$, at least one source of at least one trivalent element in oxide form $Y_2O_3$, the nitrogenous organic compounds $R(OH)_2$ and $R(Br)_2$, $R(OH)_2$ being 1,6-bis(methylpiperidinium)hexane dihydroxide, and $R(Br)_2$ being 1,6-bis(methylpiperidinium) hexane dibromide, and at least one source of at least one alkali metal M of valency n chosen from alkali metal chlorides, n being an integer greater than or equal to 1, M being chosen from lithium, potassium, sodium, caesium and a mixture of at least two of these metals.

In the molar composition of the above reaction mixture and throughout the description:

$XO_2$ denotes the molar amount of the tetravalent element(s) expressed in oxide form, and $Y_2O_3$ denotes the molar amount of the trivalent element(s) expressed in oxide form, $H_2O$ the molar amount of water present in the reaction mixture, $R(OH)_2$ and $R(Br)_2$, the molar amounts of said nitrogenous organic compounds, $M_{1/n}Cl$ the molar amount, expressed in the form of $M_{1/n}Cl$, of the source of alkali metal present in the form of alkali metal chloride.

In accordance with the invention, at least one source of at least one oxide $XO_2$ is incorporated into the mixture to perform step (i) of the preparation process, X being one or more tetravalent elements chosen from the group formed by the following elements: silicon, germanium, titanium, X preferably being silicon.

When X is silicon, the source(s) of said tetravalent element(s) may be any compound comprising the element X and which can release this element in aqueous solution in reactive form.

The source of silicon may be any one of said sources commonly used for zeolite synthesis, for example powdered silica, silicic acid, colloidal silica, dissolved silica or tetraethoxysilane (TEOS). Among the powdered silicas, use may be made of precipitated silicas, especially those obtained by precipitation from a solution of alkali metal silicate, fumed silicas, for example Cab-O-Sil, and silica gels. Colloidal silicas having various particle sizes, for example a mean equivalent diameter of between 10 and 15 nm or between 40 and 50 nm may be used, such as those sold under registered brand names such as Ludox. Preferably, the source of silicon is Ludox HS-40.

When X is titanium, Ti(EtO)$_4$ is advantageously used as source of titanium.

In accordance with the invention, at least one source of at least one oxide Y$_2$O$_3$ is incorporated into the mixture to perform said step (i) of the preparation process according to the invention, Y being one or more trivalent elements chosen from the group formed by the following elements: aluminium, iron, boron, indium and gallium, and at least one of the trivalent elements Y being aluminium.

The source of aluminium is preferably aluminium hydroxide or an aluminium salt, for example chloride, nitrate or sulfate, a sodium aluminate, an aluminium alkoxide, or alumina itself, preferably in hydrated or hydratable form, for instance colloidal alumina, pseudoboehmite, gamma-alumina or alpha or beta trihydrate. Use may also be made of mixtures of the sources mentioned above.

In accordance with the invention, two nitrogenous organic compounds, R(OH)$_2$ and R(Br)$_2$, R(OH)$_2$ being 1,6-bis(methylpiperidinium)hexane dihydroxide, and R(Br)$_2$ being 1,6-bis(methylpiperidinium)hexane dibromide, are used as a mixture in step i), said compounds being incorporated into the reaction mixture to perform step (i), as organic structuring agent. The anions associated with the quaternary ammonium cations present in the structuring organic species for the synthesis of an IZM-2 zeolite according to the invention are the hydroxide anion and the bromide anion, respectively. The compounds R(OH)$_2$ and R(Br)$_2$ are added in step i) in molar amounts such that:

R(OH)$_2$/XO$_2$ between 0.006 and 0.25 and preferably between 0.01 and 0.15 and R(Br)$_2$/XO$_2$ between 0.006 and 0.25 and preferably between 0.01 and 0.15.

In accordance with the invention, at least one source of at least one alkali metal M of valency n chosen from alkali metal chlorides, is used in the reaction mixture of step i), n being an integer greater than or equal to 1, M preferably being chosen from lithium, potassium, sodium, caesium and a mixture of at least two of these metals. Preferably, M is sodium.

Very preferably, the source of at least one alkali metal M is sodium chloride.

In the mixing step i), sodium hydroxide NaOH is not used as source of at least one alkali metal.

In accordance with the invention, the mixture of step i) is prepared in the absence of at least one source of at least one fluoride anion, BF being chosen from fluorine salts in which B is a cation chosen from the cations NH$_4$$^+$, Na$^+$, K$^+$ and Li$^+$, and a mixture of at least two of these salts, and hydrofluoric acid in aqueous solution. Preferably, the mixture of step i) is prepared in the absence of a fluorine salt in which B is the NH$_4$$^+$ cation. Thus, the mixture of step i) is prepared in the absence of NH$_4$F in aqueous solution.

In this case, the molar amount, expressed in the form BF, of the source of fluorinated anions in the molar composition of the reaction mixture of step i) is such that:

$BF/XO_2=0$.

In a preferred embodiment, it may be advantageous to add seeds of an IZM-2 zeolite to the reaction mixture during said step i) of the process of the invention so as to reduce the time required for the formation of the crystals of an IZM-2 zeolite and/or the total crystallization time. Said seed crystals also promote the formation of said IZM-2 zeolite to the detriment of impurities. Such seeds comprise crystalline solids, notably crystals of an IZM-2 zeolite. The seed crystals are generally added in a proportion of between 0.01% and 10% of the total mass of the sources of said tetravalent and trivalent element(s) in anhydrous form used in the reaction mixture, said seed crystals not being taken into account in the total mass of the sources of the tetravalent and trivalent elements. Said seeds are not taken into account either for determining the composition of the reaction mixture and/or of the gel, defined above, i.e. in the determination of the various mole ratios of the composition of the reaction mixture.

The mixing step i) is performed until a homogeneous mixture is obtained, preferably for a time of more than or equal to 30 minutes, preferably with stirring by any system known to those skilled in the art, at a low or high shear rate.

On conclusion of step i), a homogeneous precursor gel is obtained.

Advantageously, the precursor gel obtained on conclusion of step i) has a mole ratio of the total amount expressed as oxides of tetravalent elements to the total amount expressed as oxides of trivalent elements of between 80 and 300.

In the case where X=Si and Y=Al, the precursor gel obtained on conclusion of step i) has an SiO$_2$/Al$_2$O$_3$ mole ratio of between 80 and 300.

According to one embodiment, it may be advantageous to perform maturation, during said step i), of the reaction mixture obtained on conclusion of step i) and before the hydrothermal crystallization step ii) so as to control the size of the crystals of an IZM-2 zeolite. Said maturation also promotes the formation of said IZM-2 zeolite to the detriment of impurities. Maturation of the reaction mixture obtained on conclusion of said step i) of the process of the invention may be performed at room temperature or at a temperature of between 20 and 100° C. with or without stirring, for a time advantageously between 30 minutes and 48 hours.

In accordance with the invention, the process comprises a step ii) which consists of hydrothermal treatment of said precursor gel obtained on conclusion of step i) at a temperature of between 120° C. and 220° C., for a time of between 1 day and 8 days.

Step ii) of hydrothermal treatment of said precursor gel is performed until said IZM-2 zeolite crystallizes.

The precursor gel is advantageously placed under hydrothermal conditions at an autogenous reaction pressure, optionally with addition of gas, for example nitrogen, at a temperature of between 120° C. and 220° C., preferably between 150° C. and 195° C., until an IZM-2 zeolite has fully crystallized.

The time required to obtain crystallization ranges between 1 day and 8 days, preferably between 1 day and 7 days, more preferably between 2 days and 6 days, very preferably 2 days to 5 days and even more preferably 2 days to 4.5 days.

Step ii) of hydrothermal treatment of said precursor gel is preferably performed with stirring or without stirring, preferably with stirring. The stirring system that may be used is any system known to those skilled in the art, for example inclined paddles with counter-blades, stirring turbomixers or endless screws.

At the end of the reaction, after performing said step ii) of the preparation process according to the invention, the solid phase formed from an IZM-2 zeolite is preferably filtered, washed and then dried.

The drying is generally performed at a temperature of between 20° C. and 150° C., preferably between 60° C. and 100° C., for a time of between 5 and 24 hours.

The dried zeolite may then advantageously be calcined. The calcined IZM-2 zeolite is generally analysed by x-ray diffraction, this technique also making it possible to determine the purity of said zeolite obtained via the process of the invention.

Very advantageously, the process of the invention leads to the formation of an IZM-2 zeolite, free of any other crystalline or amorphous phase. Said IZM-2 zeolite, after the drying step, is then ready for subsequent steps such as calcination and ion exchange. For these steps, any conventional method known to those skilled in the art may be employed.

The step of calcining an IZM-2 zeolite obtained according to the process of the invention is preferably performed at a temperature of between 450 and 700° C. for a time of between 2 and 20 hours, the calcination possibly being preceded by a gradual temperature increase.

The IZM-2 zeolite obtained on conclusion of the calcination step is free of any organic species and in particular of the organic structuring agents $R(OH)_2$ and $R(Br)_2$.

On conclusion of said calcination step, X-ray diffraction makes it possible to confirm that the solid obtained via the process according to the invention is indeed an IZM-2 zeolite. The purity obtained is advantageously greater than 90%, preferably greater than 95% and very preferably greater than 99.8% by weight. The solid obtained has the X-ray diffraction pattern which includes at least the lines recorded in Table 1. Preferably, the X-ray diffraction pattern does not contain any other lines of significant intensity (i.e. with an intensity of about three times the background noise) than those recorded in Table 1.

This diffraction pattern is obtained by radiocrystallographic analysis by means of a diffractometer using the conventional powder method with the Kα1 radiation of copper ($\lambda=1.5406$ Å). On the basis of the position of the diffraction peaks represented by the angle 2θ, the interplanar spacings dhkl characteristic of the sample are calculated using the Bragg relationship. The measurement error $\Delta(d_{hkl})$ on dhkl is calculated by means of the Bragg relationship as a function of the absolute error $\Delta(2\theta)$ assigned to the measurement of 2θ. An absolute error $\Delta(2\theta)$ equal to $\pm 0.02°$ is commonly accepted. The relative intensity Irel assigned to each value of dhkl is measured from the height of the corresponding diffraction peak. The X-ray diffraction pattern of the IZM-2 crystalline solid according to the invention includes at least the lines at the values of dhkl given in Table 1. The column of the dhkl values gives the mean values of the interplanar spacings in Angströms (Å). Each of these values must be assigned the measurement error $\Delta(d_{hkl})$ of between ±0.6 Å and ±0.01 Å.

TABLE 1

Mean values of $d_{hkl}$ and relative intensities measured on an X-ray diffraction pattern of the IZM-2 crystalline solid

| 2 theta (°) | dhkl (Å) | Irel |
|---|---|---|
| 7.26 | 12.17 | m |
| 7.65 | 11.56 | m |
| 8.71 | 10.14 | mw |
| 12.09 | 7.31 | vw |
| 14.77 | 5.99 | vw |
| 15.25 | 5.81 | vw |
| 18.06 | 4.91 | vw |

TABLE 1-continued

Mean values of $d_{hkl}$ and relative intensities measured on an X-ray diffraction pattern of the IZM-2 crystalline solid

| 2 theta (°) | dhkl (Å) | Irel |
|---|---|---|
| 18.95 | 4.68 | vw |
| 21.14 | 4.19 | VS |
| 22.29 | 3.98 | w |
| 23.55 | 3.85 | m |
| 24.47 | 3.78 | vw |
| 26.72 | 3.64 | vw |
| 29.39 | 3.33 | vw |
| 33.02 | 3.04 | vw |
| 36.62 | 2.45 | vw |
| 44.56 | 2.03 | vw |
| 49.04 | 1.86 | vw | where VS=very strong; S=strong; m=moderate; mw=moderately weak; w=weak; vw=very weak. The relative intensity Irel is given in relation to a relative intensity scale in which a value of 100 is attributed to the most intense line in the x-ray diffraction diagram: vw<15; 15≤w<30; 30≤mw<50; 50≤m<65; 65≤S<85; VS≥85.

It is also advantageous to obtain the protonated form of the IZM-2 zeolite obtained via the process according to the invention. Said hydrogen form may be obtained by performing an ion exchange with an acid, in particular a strong mineral acid such as hydrochloric, sulfuric or nitric acid, or with a compound such as ammonium chloride, sulfate or nitrate. The ion exchange may be performed by placing said IZM-2 zeolite in suspension one or more times with the ion-exchange solution. Said zeolite may be calcined before or after the ion exchange or between two ion-exchange steps. The zeolite is preferably calcined before the ion exchange, so as to remove any organic substance included in the porosity of the zeolite, since the ion exchange is thereby facilitated.

The IZM-2 zeolite obtained via the process of the invention may be used after ion exchange as acidic solid for catalysis in the fields of refining and petrochemistry. It may also be used as an absorbent or as a molecular sieve.

The process according to the invention allows the production of an IZM-2 zeolite advantageously having an $SiO_2/Al_2O_3$ ratio of between 70 and 350, preferably between 80 and 300 in the case where X=Si, and Y=Al.

LIST OF FIGURES

FIG. 1 represents the chemical formula of the nitrogenous organic compounds chosen as structuring agent in the synthetic process according to the invention.

FIG. 2 represents the X-ray diffraction pattern of the IZM-2 zeolite obtained according to Example 6.

FIG. 3 represents the X-ray diffraction pattern of the ZSM-5 zeolite obtained according to Comparative Example 8.

Other characteristics and advantages of the synthetic process according to the invention will become apparent on reading the following description of non-limiting exemplary embodiments with reference to the appended figures described below.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. FR 1910620, filed Sep. 26, 2019 are incorporated by reference herein.

EXAMPLES

Example 1

Preparation of 1,6-bis(methylpiperidinium)hexane dibromide [R(Br)$_2$]

50 g of 1,6-dibromohexane (0.20 mol, 99%, Alfa Aesar) are placed in a 1 L round-bottomed flask containing 50 g of N-methylpiperidine (0.51 mol, 99%, Alfa Aesar) and 200 mL of ethanol. The reaction medium is stirred at reflux for 5 hours. The mixture is then cooled to room temperature and then filtered. The mixture is poured into 300 mL of cold diethyl ether and the precipitate formed is then filtered off and washed with 100 mL of diethyl ether. The solid obtained is recrystallized from an ethanol/ether mixture. The solid obtained is dried under vacuum for 12 hours. 71 g of a white solid are obtained (i.e. a yield of 80%).

The product has the expected 1H NMR spectrum. 1H NMR (D$_2$O, ppm/TMS): 1.27 (4H, m); 1.48 (4H, m); 1.61 (4H, m); 1.70 (8H, m); 2.85 (6H, s); 3.16 (12H, m).

Example 2

Preparation of 1,6-bis(methylpiperidinium)hexane dihydroxide [R(OH)$_2$]

18.9 g of Ag$_2$O (0.08 mol, 99%, Aldrich) are placed in a 250 ml Teflon beaker containing 30 g of the structuring agent 1,6-bis(methylpiperidinium) dibromide (0.07 mol) prepared according to Example 1 and 100 ml of deionized water. The reaction medium is stirred for 12 hours in the absence of light. The mixture is then filtered. The filtrate obtained is composed of an aqueous solution of 1,6-bis(methylpiperidinium)hexane dihydroxide. Assay of this species is performed by proton NMR using formic acid as standard.

Example 3

Preparation of an IZM-2 Solid According to the Invention 2.064 g of an aqueous solution of 1,6-bis(methylpiperidinium)hexane dibromide (21.5% by weight) prepared according to Example 1 and 1.738 g of an aqueous solution of 1,6-bis(methylpiperidinium)hexane dihydroxide (18.36% by weight) prepared according to Example 2 are mixed with 1.622 g of deionized water. 0.426 g of sodium chloride (solid, purity of 99% by weight, Alfa Aesar) is added to the preceding mixture, and the preparation obtained is kept stirring for 10 minutes. 0.009 g of amorphous aluminium hydroxide gel (amorphous Al(OH)$_3$ gel, 58.55% Al$_2$O$_3$, Merck) is then incorporated and the synthetic gel is kept stirring for 15 minutes. Finally, 1.814 g of colloidal silica (Ludox HS40, 40% by weight, Aldrich) are incorporated into the synthesis mixture, which is kept stirring for 30 minutes to evaporate off the solvent until the desired precursor gel composition is obtained, i.e. a molar composition of the following mixture: 60 SiO$_2$:0.25 Al$_2$O$_3$:5 R(Br)$_2$:5 R(OH)$_2$:9.6 NaCl:1770 H$_2$O, i.e. an SiO$_2$/Al$_2$O$_3$ ratio of 240. The precursor gel is then transferred, after homogenization, into an autoclave. The autoclave is closed and then heated for 4 days at 170° C. with stirring at 32 rpm with a rotary spit system. The crystalline product obtained is filtered off, washed with deionized water and then dried overnight at 100° C. The solid is then introduced into a muffle furnace where a calcination step is performed: the calcination cycle comprises an increase in temperature of 1.5° C./minute up to 200° C., a steady stage at 200° C. maintained for 2 hours, an increase in temperature of 1° C./minute up to 550° C., followed by a steady stage at 550° C. maintained for 8 hours, then return to room temperature.

The calcined solid product was analysed by X-ray diffraction and identified as consisting of an IZM-2 zeolite with a purity of greater than 99.8%.

Example 4

Preparation of an IZM-2 Solid According to the Invention 2.079 g of an aqueous solution of 1,6-bis(methylpiperidinium)hexane dibromide (21.5% by weight) prepared according to Example 1 and 1.746 g of an aqueous solution of 1,6-bis(methylpiperidinium)hexane dihydroxide (18.36% by weight) prepared according to Example 2 are mixed with 1.811 g of deionized water. 0.219 g of sodium chloride (solid, purity of 99% by weight, Alfa Aesar) is added to the preceding mixture, and the preparation obtained is kept stirring for 10 minutes. 0.009 g of amorphous aluminium hydroxide gel (amorphous Al(OH)$_3$ gel, 58.55% Al$_2$O$_3$, Merck) is then incorporated and the synthetic gel is kept stirring for 15 minutes. Finally, 1.823 g of colloidal silica (Ludox HS40, 40% by weight, Aldrich) are incorporated into the synthesis mixture, which is kept stirring for 30 minutes to evaporate off the solvent until the desired precursor gel composition is obtained, i.e. a molar composition of the following mixture: 60 SiO$_2$:0.25 Al$_2$O$_3$:5 R(Br)$_2$:5 R(OH)$_2$:4.8 NaCl:1770 H$_2$O, i.e. an SiO$_2$/Al$_2$O$_3$ ratio of 240. The precursor gel is then transferred, after homogenization, into an autoclave. The autoclave is closed and then heated for 4 days at 170° C. with stirring at 32 rpm with a rotary spit system. The crystalline product obtained is filtered off, washed with deionized water and then dried overnight at 100° C. The solid is then introduced into a muffle furnace where a calcination step is performed: the calcination cycle comprises an increase in temperature of 1.5° C./minute up to 200° C., a steady stage at 200° C. maintained for 2 hours, an increase in temperature of 1° C./minute up to 550° C., followed by a steady stage at 550° C. maintained for 8 hours, then return to room temperature.

The calcined solid product was analysed by X-ray diffraction and identified as consisting of an IZM-2 zeolite with a purity of greater than 99.8%.

Example 5

Preparation of an IZM-2 Solid According to the Invention 1.586 g of an aqueous solution of 1,6-bis(methylpiperidinium)hexane dibromide (21.5% by weight) prepared according to Example 1 and 1.336 g of an aqueous solution of 1,6-bis(methylpiperidinium)hexane dihydroxide (18.36% by weight) prepared according to Example 2 are mixed with 2.537 g of deionized water. 0.438 g of sodium chloride (solid, purity of 99% by weight, Alfa Aesar) is added to the preceding mixture, and the preparation obtained is kept stirring for 10 minutes. 0.009 g of amorphous aluminium hydroxide gel (amorphous Al(OH)$_3$ gel, 58.55% Al$_2$O$_3$, Merck) is then incorporated and the synthetic gel is kept stirring for 15 minutes. Finally, 1.884 g of colloidal silica (Ludox HS40, 40% by weight, Aldrich) are incorporated into the synthesis mixture, which is kept stirring for 30 minutes to evaporate off the solvent until the desired precursor gel composition is obtained, i.e. a molar composition of the following mixture: 60 SiO$_2$:0.25 Al$_2$O$_3$:3.75 R(Br)$_2$: 3.75 R(OH)$_2$:9.6 NaCl:1770 H$_2$O, i.e. an SiO$_2$/Al$_2$O$_3$ ratio of 240. The precursor gel is then transferred, after homogenization, into an autoclave. The autoclave is closed and then heated for 3 days at 170° C. with stirring at 32 rpm with a rotary spit system. The crystalline product obtained is filtered off, washed with deionized water and then dried overnight at 100° C. The solid is then introduced into a muffle furnace where a calcination step is performed: the calcination cycle comprises an increase in temperature of 1.5° C./minute up to 200° C., a steady stage at 200° C. maintained for 2 hours, an increase in temperature of 1° C./minute up to 550° C., followed by a steady stage at 550° C. maintained for 8 hours, then return to room temperature.

The calcined solid product was analysed by X-ray diffraction and identified as consisting of an IZM-2 zeolite with a purity of greater than 99.8%.

Example 6

Preparation of an IZM-2 Solid According to the Invention 2.064 g of an aqueous solution of 1,6-bis(methylpiperidinium)hexane dibromide (21.5% by weight) prepared according to Example 1 and 1.737 g of an aqueous solution of 1,6-bis(methylpiperidinium)hexane dihydroxide (18.36% by weight) prepared according to Example 2 are mixed with 1.619 g of deionized water. 0.432 g of sodium chloride (solid, purity of 99% by weight, Alfa Aesar) is added to the preceding mixture, and the preparation obtained is kept stirring for 10 minutes. 0.012 g of amorphous aluminium hydroxide gel (amorphous Al(OH)$_3$ gel, 58.55% Al$_2$O$_3$, Merck) is then incorporated and the synthetic gel is kept stirring for 15 minutes. Finally, 1.807 g of colloidal silica (Ludox HS40, 40% by weight, Aldrich) are incorporated into the synthesis mixture, which is kept stirring for 30 minutes to evaporate off the solvent until the desired precursor gel composition is obtained, i.e. a molar composition of the following mixture: 60 SiO$_2$:0.35 Al$_2$O$_3$:5 R(Br)$_2$:5 R(OH)$_2$:9.6 NaCl:1770 H$_2$O, i.e. an SiO$_2$/Al$_2$O$_3$ ratio of 171.4. The precursor gel is then transferred, after homogenization, into an autoclave. The autoclave is closed and then heated for 3 days at 170° C. with stirring at 32 rpm with a rotary spit system. The crystalline product obtained is filtered off, washed with deionized water and then dried overnight at 100° C. The solid is then introduced into a muffle furnace where a calcination step is performed: the calcination cycle comprises an increase in temperature of 1.5° C./minute up to 200° C., a steady stage at 200° C. maintained for 2 hours, an increase in temperature of 1° C./minute up to 550° C., followed by a steady stage at 550° C. maintained for 8 hours, then return to room temperature.

The calcined solid product was analysed by X-ray diffraction and identified as consisting of an IZM-2 zeolite with a purity of greater than 99.8%. The diffraction pattern produced for the calcined IZM-2 microporous solid is given in FIG. 2.

Example 7

Preparation of an IZM-2 Solid According to the Invention 2.046 g of an aqueous solution of 1,6-bis(methylpiperidinium)hexane dibromide (21.5% by weight) prepared according to Example 1 and 1.726 g of an aqueous solution of 1,6-bis(methylpiperidinium)hexane dihydroxide (18.36% by weight) prepared according to Example 2 were mixed with 1.422 g of deionized water. 0.676 g of sodium chloride (solid, purity of 99% by weight, Alfa Aesar) is added to the preceding mixture, and the preparation obtained is kept stirring for 10 minutes. 0.021 g of amorphous aluminium hydroxide gel (amorphous Al(OH)$_3$ gel, 58.55% Al$_2$O$_3$, Merck) is then incorporated and the synthetic gel is kept stirring for 15 minutes. Finally, 1.814 g of colloidal silica (Ludox HS40, 40% by weight, Aldrich) are incorporated into the synthesis mixture, which is kept stirring for 30 minutes to evaporate off the solvent until the desired precursor gel composition is obtained, i.e. a molar composition of the following mixture: 60 SiO$_2$:0.6 Al$_2$O$_3$:5 R(Br)$_2$:5 R(OH)$_2$:15 NaCl:1770 H$_2$O, i.e. an SiO$_2$/Al$_2$O$_3$ ratio of 100. The precursor gel is then transferred, after homogenization, into an autoclave. The autoclave is closed and then heated for 3 days at 170° C. with stirring at 32 rpm with a rotary spit system. The crystalline product obtained is filtered off, washed with deionized water and then dried overnight at 100° C. The solid is then introduced into a muffle furnace where a calcination step is performed: the calcination cycle comprises an increase in temperature of 1.5° C./minute up to 200° C., a steady stage at 200° C. maintained for 2 hours, an increase in temperature of 1° C./minute up to 550° C., followed by a steady stage at 550° C. maintained for 8 hours, then return to room temperature.

The calcined solid product was analysed by X-ray diffraction and identified as consisting of an IZM-2 zeolite with a purity of greater than 99.8%.

Comparative Example 8

Preparation of an IZM-2 Solid not in Accordance with the Invention

Example 8 is not in accordance with the invention since the process is performed in fluorinated medium.

2.045 g of an aqueous solution of 1,6-bis(methylpiperidinium)hexane dibromide (21.5% by weight) prepared according to Example 1 and 1.755 g of an aqueous solution of 1,6-bis(methylpiperidinium)hexane dihydroxide (18.36% by weight) prepared according to Example 2 are mixed with 0.867 g of deionized water. 0.421 g of sodium chloride (solid, purity of 99% by weight, Alfa Aesar) is added to the preceding mixture, and the preparation obtained is kept stirring for 10 minutes. 0.012 g of amorphous aluminium hydroxide gel (amorphous Al(OH)$_3$ gel, 58.55% Al$_2$O$_3$, Merck) is then incorporated and the synthetic gel is kept stirring for 15 minutes. 1.799 g of colloidal silica (Ludox HS40, 40% by weight, Aldrich) are incorporated into the mixture, which is kept stirring for 15 minutes. Finally, 0.831 g of aqueous ammonium fluoride solution (10% by weight) is incorporated into the synthetic mixture, which is kept stirring for 30 minutes to evaporate off the solvent until the composition of the desired precursor gel is obtained, i.e. a molar composition of the following mixture: 60 $SiO_2$:0.35 $Al_2O_3$:5 $R(Br)_2$:5 $R(OH)_2$:9.6 NaCl:1770 $H_2O$:10 $NH_4F$, i.e. an $SiO_2/Al_2O_3$ ratio of 171. The precursor gel is then transferred, after homogenization, into an autoclave. The autoclave is closed and then heated for 14 days at 170° C. with stirring at 32 rpm with a rotary spit system. The crystalline product obtained is filtered off, washed with deionized water and then dried overnight at 100° C. The solid is then introduced into a muffle furnace where a calcination step is performed: the calcination cycle comprises an increase in temperature of 1.5° C./minute up to 200° C., a steady stage at 200° C. maintained for 2 hours, an increase in temperature of 1° C./minute up to 550° C., followed by a steady stage at 550° C. maintained for 8 hours, then return to room temperature.

The calcined solid product was analysed by X-ray diffraction and identified as consisting of a zeolite of MFI framework type with a purity of greater than 95% by weight. In this case, the IZM-2 zeolite is not obtained.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process comprising preparing an IZM-2 zeolite, by at least the following:
  i) mixing, in aqueous medium, at least one source of at least one tetravalent element X in oxide form $XO_2$, at least one source of at least one trivalent element in oxide form $Y_2O_3$, nitrogenous organic compounds $R(OH)_2$ and $R(Br)_2$, $R(OH)_2$ being 1,6-bis(methylpiperidinium)hexane dihydroxide, and $R(Br)_2$ being 1,6-bis(methylpiperidinium)hexane dibromide, and at least one alkali metal chloride as a source of at least one alkali metal M of valency n, n being an integer greater than or equal to 1, M being lithium, potassium, sodium, cesium or a mixture of at least two of these metals, and in the absence of at least one source of at least one fluoride anion termed BF, BF being hydrofluoric acid in aqueous solution or fluorine salts in which B is a $NH_4^+$, $Na^+$, $K^+$ or $Li^+$ cation, or a mixture of at least two of these salts, the reaction mixture having the following molar composition:
  $XO_2/Y_2O_3$ 70 and 350,
  $H_2O/XO_2$ 1 and 100,
  $R(OH)_2/XO_2$ 0.006 to 0.25,
  $R(Br)_2/XO_2$ 0.006 to 0.25,
  $M_{1/n}Cl/XO_2$ 0.005 to 0.5,
  with X being silicon, germanium, titanium or a mixture of at least two of these tetravalent elements,
  Y being aluminium, boron, iron, indium and gallium, or a mixture of at least two of these trivalent elements, until a homogeneous precursor gel is obtained;
  ii) hydrothermal treatment of said precursor gel obtained on conclusion of i) at a temperature of 120° C. to 220° C., for a time of between 1 day and 8 days.

2. The process according to claim 1, in which the mixture of i) also further comprises one or more tetravalent elements X other than silicon: germanium or titanium and/or one or more trivalent elements Y, other than aluminium: iron, boron, indium or gallium.

3. The process according to claim 1, in which the reaction mixture from i) has the following molar composition:
  $XO_2/Y_2O_3$ 80 and 300
  $H_2O/XO_2$ 5 and 50
  $R(OH)_2/XO_2$ 0.01 to 0.15
  $R(Br)_2/XO_2$ 0.01 to 0.15
  $M_{1/n}Cl/XO_2$ 0.02 to 0.3;
  X, Y, R and M having the abovementioned meaning.

4. The process according to claim 1, in which M is sodium.

5. The process according to claim 1, in which the mixture of i) is prepared in the absence of a fluorine salt BF in which B is the $NH_4^+$ cation.

6. The process according to claim 1, in which seed crystals of an IZM-2 zeolite are added to the reaction mixture from i) in an amount of 0.01% to 10% of the total mass of the sources of said tetravalent and trivalent element(s) in anhydrous form used in the reaction mixture, said seed crystals not being taken into account in the total mass of the sources of the tetravalent and trivalent elements.

7. The process according to claim 1, in which i) comprises maturing the reaction mixture obtained at a temperature of 20 to 100° C., with or without stirring, for a time of 30 minutes to 48 hours.

8. The process according to claim 1, in which the hydrothermal treatment of ii) is performed under autogenous pressure at a temperature of 150° C. to 195° C.

9. The process according to claim 8, in which the solid phase obtained on conclusion of ii) may be filtered, washed and dried at a temperature of 20 to 150° C., for a time of 5 to 24 hours to obtain a dried zeolite.

10. The process according to claim 9, in which the dried zeolite is then calcined at a temperature of 450 to 700° C. for a time of 2 to 20 hours, the calcination optionally being preceded by a gradual temperature increase.

11. The process according to claim 1, in which the hydrothermal treatment of ii) is performed for a time of between 1 day and 7 days.

12. The process according to claim 11, in which the hydrothermal treatment is performed for a time of 2 to 6 days.

13. The process according to claim 12, in which the hydrothermal treatment is performed for a time of 2 to 5 days.

14. The process according to claim 13, in which the hydrothermal treatment is performed for a time of 2 to 4.5 days.

* * * * *